United States Patent
Nobumoto (10) Patent No.: US 11,241,976 B2
(45) Date of Patent: Feb. 8, 2022

(54) VEHICLE HAVING SWITCHING CONTROLLER

(71) Applicant: SUBARU CORPORATION, Tokyo (JP)

(72) Inventor: Yasukazu Nobumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 44 days.

(21) Appl. No.: 16/853,944

(22) Filed: Apr. 21, 2020

(65) Prior Publication Data

US 2020/0391611 A1 Dec. 17, 2020

(30) Foreign Application Priority Data

Jun. 17, 2019 (JP) .............................. JP2019-111687

(51) Int. Cl.
| | |
|---|---|
| *B60K 1/04* | (2019.01) |
| *B60L 58/12* | (2019.01) |
| *B60L 50/60* | (2019.01) |
| *B60K 1/00* | (2006.01) |
| *B60L 58/26* | (2019.01) |

(52) U.S. Cl.
CPC .............. *B60L 58/12* (2019.02); *B60K 1/00* (2013.01); *B60K 1/04* (2013.01); *B60L 50/60* (2019.02); *B60L 58/26* (2019.02)

(58) Field of Classification Search
CPC ............ B60K 1/04; B60L 58/26; B60L 58/12
See application file for complete search history.

(56) References Cited

U.S. PATENT DOCUMENTS

| | | | | |
|---|---|---|---|---|
| 2003/0158638 A1* | 8/2003 | Yakes | .................. | G01M 17/00 701/22 |
| 2004/0254047 A1* | 12/2004 | Frank | .................. | B60W 10/08 477/37 |
| 2011/0288711 A1* | 11/2011 | Yanagisawa | .......... | B60W 10/26 701/22 |
| 2014/0265565 A1* | 9/2014 | Cooley | .................... | H02P 6/18 307/18 |
| 2020/0391611 A1* | 12/2020 | Nobumoto | ................ | B60L 7/18 |

FOREIGN PATENT DOCUMENTS

JP 2018-70033 A 5/2018

* cited by examiner

*Primary Examiner* — James A Shriver, II
*Assistant Examiner* — James J Triggs
(74) *Attorney, Agent, or Firm* — Troutman Pepper Hamilton Sanders LLP (57) ABSTRACT

A vehicle includes: a battery; a motor-generator configured to be coupled to a wheel; a power converter configured to convert and supply, to the motor-generator, power of the battery and to convert and feed back, to the battery, power generated in the motor-generator in response to rotation of the wheel; an SOC deriving unit configured to derive a state-of-charge of the battery; a battery temperature sensor configured to detect a temperature of the battery; and a switching controller configured to derive, based on the state-of-charge and the temperature, a number of revolutions for switching at which switching between servo-off control and zero-torque control is performed, and to perform the servo-off control if a number of revolutions of the motor-generator is equal to or lower than the number of revolutions for switching and perform the zero-torque control if the number of revolutions is higher than the number of revolutions for switching.

3 Claims, 9 Drawing Sheets

VEHICLE HAVING SWITCHING CONTROLLER

CROSS-REFERENCE TO RELATED APPLICATIONS

The present application claims priority from Japanese Patent Application No. 2019-111687 filed on Jun. 17, 2019, the entire contents of which are hereby incorporated by reference.

BACKGROUND

The disclosure relates to a vehicle.

A technique in which the counter-electromotive force of an electric motor is estimated and switching between shutdown control and zero-torque control is performed is disclosed (for example, Japanese Unexamined Patent Application Publication No. 2018-70033). In this technique, an inverter is shut down in the shutdown control, and the inverter is controlled so that the torque of the electric motor becomes zero in the zero-torque control. In the shutdown control, power generated in the electric motor (electric generator) can be fed back to a battery (regeneration). In the zero-torque control, regeneration is not performed. The shutdown control is also referred to as servo-off control.

SUMMARY

An aspect of the disclosure provides a vehicle including a battery, a motor-generator, a power converter, an SOC deriving unit, a battery temperature sensor, and a switching controller. The motor-generator is configured to be coupled to a wheel. The power converter is configured to be capable of converting and supplying, to the motor-generator, power of the battery and to be capable of converting and feeding back, to the battery, power generated in the motor-generator in response to rotation of the wheel. The SOC deriving unit is configured to derive a state-of-charge of the battery. The battery temperature sensor is configured to detect a temperature of the battery. The switching controller is configured to derive a number of revolutions for switching on the basis of the state-of-charge of the battery and the temperature of the battery, the number of revolutions for switching being a number of revolutions of the motor-generator that serves as a threshold at which switching between servo-off control and zero-torque control is performed, the servo-off control being control that allows the power to be fed back via the power converter, the zero-torque control being control in which the power converter is controlled so that a torque of the motor-generator becomes zero, and to perform the servo-off control in a case where the number of revolutions of the motor-generator is equal to or lower than the number of revolutions for switching and perform the zero-torque control in a case where the number of revolutions of the motor-generator is higher than the number of revolutions for switching.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

For example, in a case where the shift position is changed to Neutral during traveling, the vehicle is not to be driven, and therefore, servo-off control (shutdown control) is performed for a power converter (inverter) so that power generated in a motor-generator (electric motor) can be fed back to a battery. However, in a case where the servo-off control is performed when the shift position is changed to Neutral in a state where the vehicle speed is high (the number of revolutions of the motor-generator is high), the voltage of the power generated in the motor-generator (the induced voltage of the motor-generator) becomes higher than the battery voltage, and the battery may be damaged. In such a case, switching to zero-torque control is performed so as not to feed back the power and not to generate driving force.

The battery voltage changes in accordance with the battery temperature, and therefore, the number of revolutions of the motor-generator (the speed of the vehicle) at which switching to the zero-torque control is to be performed changes depending on the temperature. Accordingly, when switching to the zero-torque control is performed regardless of the battery temperature, the zero-torque control may be performed in a situation where the servo-off control can be performed or the servo-off control may be performed in a situation where the zero-torque control is to be performed. That is, switching between the servo-off control and the zero-torque control might not be appropriately performed.

Accordingly, it is desirable to provide a vehicle in which switching between the servo-off control and the zero-torque control can be appropriately performed even when the battery temperature changes.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
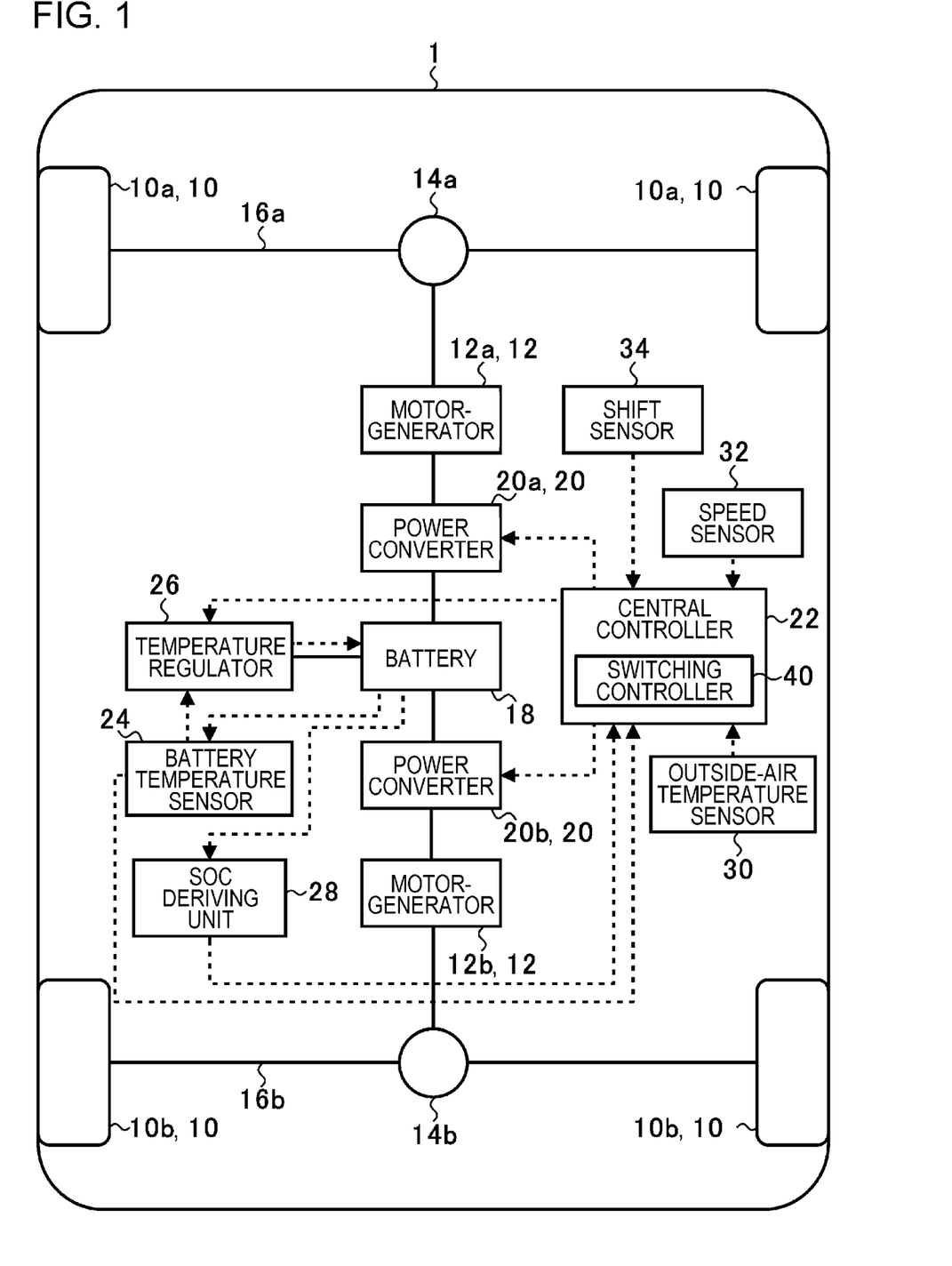
FIG. 1 is a schematic diagram illustrating a configuration of a vehicle according to an embodiment.

FIG. 1 is a schematic diagram illustrating a configuration of a vehicle 1 according to the embodiment. In FIG. 1, flows of control signals are indicated by dashed arrows. Detailed descriptions of configurations and processes related to the embodiment are given below, and descriptions of configurations or processes not related to the embodiment are omitted.

The vehicle 1 includes front wheels 10a, rear wheels 10b, motor-generators 12a and 12b, differential gears 14a and 14b, drive shafts 16a and 16b, a battery 18, power converters 20a and 20b, a central controller 22, a battery temperature sensor 24, a temperature regulator 26, a state-of-charge (SOC) deriving unit 28, an outside-air temperature sensor 30, a speed sensor 32, and a shift sensor 34.

The vehicle 1 is an electric vehicle including the motor-generator 12a that drives the front wheels 10a and the motor-generator 12b that drives the rear wheels 10b as driving sources. Hereinafter, the front wheels 10a and the rear wheels 10b may be collectively referred to as wheels 10, the motor-generators 12a and 12b may be collectively referred to as motor-generators 12, and the power converters 20a and 20b may be collectively referred to as power converters 20. Further, the vehicle 1 may be referred to as "the vehicle".

The vehicle 1 in which one motor-generator 12 is provided for the front wheels 10a and another one for the rear wheels 10b are illustrated; however, the vehicle 1 may be an electric vehicle in which, for example, one motor-generator drives both the front wheels 10a and the rear wheels 10b. The vehicle 1 may be a hybrid electric vehicle in which both an engine and the motor-generators 12 are provided.

Each motor-generator 12 is, for example, a permanent-magnet synchronous motor-generator, but is not limited to this and may be an induction motor-generator. The specifications (for example, rated power output) of the motor-generator 12a and those of the motor-generator 12b may be different or may be the same.

The rotating shaft of the motor-generator 12a is coupled to the differential gear 14a. The differential gear 14a is coupled to the front wheels 10a via the drive shaft 16a.

The rotating shaft of the motor-generator 12b is coupled to the differential gear 14b. The differential gear 14b is coupled to the rear wheels 10b via the drive shaft 16b.

The battery 18 is, for example, a secondary battery, such as a lithium-ion battery. The power converters 20 are, for example, inverters.

The power converter 20a is coupled to the battery 18 and the motor-generator 12a. The power converter 20a can convert DC power of the battery 18 to AC power and supply the AC power to the motor-generator 12a in accordance with control by the central controller 22. The motor-generator 12a consumes the AC power supplied via the power converter 20a to drive the rotating shaft. As a result, the motor-generator 12a drives the front wheels 10a via the differential gear 14a and the drive shaft 16a.

The motor-generator 12a described above not only functions as an electric motor (motor) but also functions as an electric generator (generator) in response to rotation of the front wheels 10a. The power converter 20a described above can convert AC power generated in the motor-generator 12a in response to rotation of the front wheels 10a to DC power and feed the DC power back to the battery 18.

The power converter 20b is coupled to the battery 18 and the motor-generator 12b. The power converter 20b can convert DC power of the battery 18 to AC power and supply the AC power to the motor-generator 12b in accordance with control by the central controller 22. The motor-generator 12b consumes the AC power supplied via the power converter 20b to drive the rotating shaft. As a result, the motor-generator 12b drives the rear wheels 10b via the differential gear 14b and the drive shaft 16b.

The motor-generator 12b described above not only functions as an electric motor (motor) but also functions as an electric generator (generator) in response to rotation of the rear wheels 10b. The power converter 20b described above can convert AC power generated in the motor-generator 12b in response to rotation of the rear wheels 10b to DC power and feed the DC power back to the battery 18.

Figure 2:
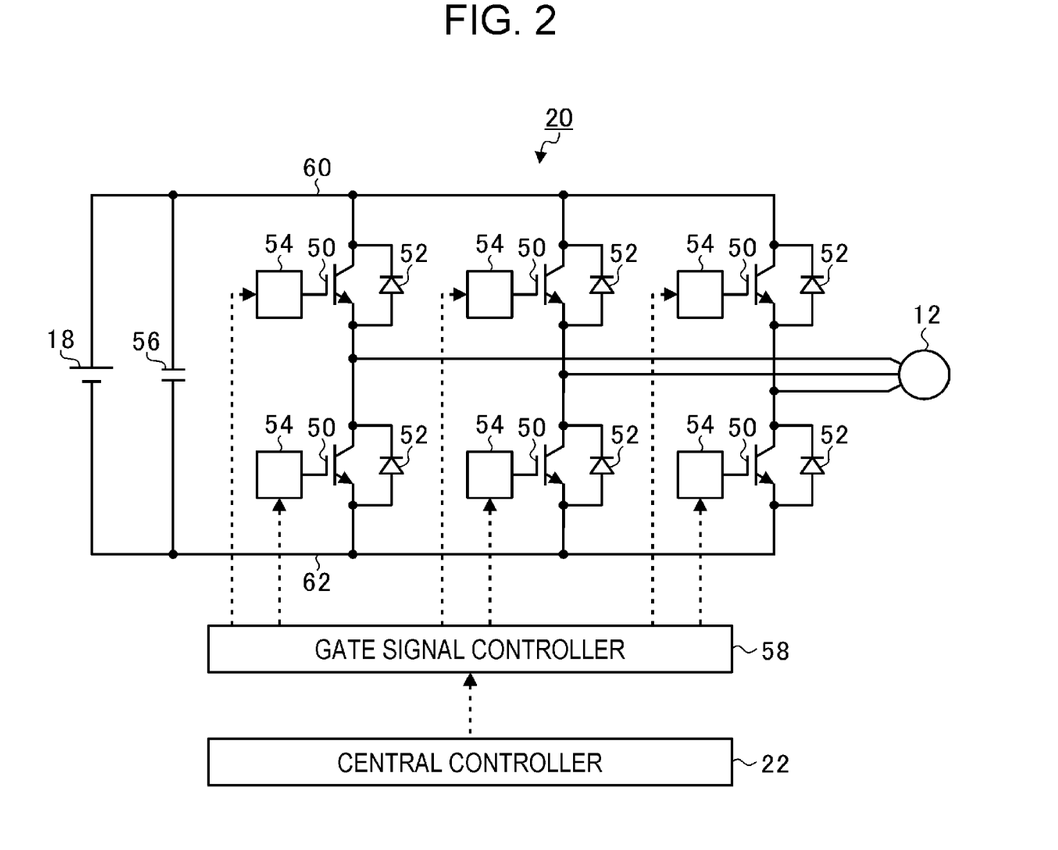
FIG. 2 is a diagram for explaining a configuration of a power converter.

FIG. 2 is a diagram for explaining a configuration of the power converter 20. The power converter 20 includes switching elements 50, diodes 52, gate driving circuits 54, a capacitor 56, and a gate signal controller 58.

Each switching element 50 is, for example, a semiconductor switch, such as an insulated-gate bipolar transistor (IGBT). In the power converter 20, two switching elements 50 are connected in series between a positive DC bus 60 and a negative DC bus 62 to constitute one arm. The power converter 20 includes three arms, and the three arms are connected in parallel between the positive DC bus 60 and the negative DC bus 62.

The motor-generator 12 is coupled to a connection node of the two switching elements 50 in each arm. The positive DC bus 60 is coupled to the positive electrode of the battery 18, and the negative DC bus 62 is coupled to the negative electrode of the battery 18. Between the positive DC bus 60 and the negative DC bus 62, the capacitor 56 is connected.

For each switching element 50, one diode 52 is connected in parallel to the switching element 50. The cathode of the diode 52 is connected to the positive DC bus 60 side, and the anode thereof is connected to the negative DC bus 62 side.

As described above, in the power converter 20, six switching elements 50 constitute a bridge circuit of the switching elements 50, and six diodes 52 constitute a bridge circuit of the diodes.

For each switching element 50, one gate driving circuit 54 is connected to the control terminal (gate) of the switching element 50. The gate driving circuit 54 turns the switching element 50 on or off in accordance with a gate signal transmitted from the gate signal controller 58. The gate signal controller 58 transmits the gate signal to each gate driving circuit 54 in accordance with control by the central controller 22. That is, when each switching element 50 is controlled to be turned on or off, the power converter 20 can convert power between the battery 18 and the motor-generator 12.

Referring back to FIG. 1, the battery temperature sensor 24 detects the temperature of the battery 18 (hereinafter sometimes referred to as the battery temperature).

The temperature regulator 26 regulates the temperature of the battery 18 in accordance with control by the central controller 22 on the basis of the battery temperature detected by the battery temperature sensor 24. To regulate the temperature of the battery 18, power of the battery 18 is consumed. The temperature regulator 26 includes, for example, a cooling pump (not illustrated) and a heat exchanger (not illustrated). The cooling pump consumes power of the battery 18 to circulate cooling water between the battery 18 and the heat exchanger. The heat exchanger exchanges heat between outside air (air outside the vehicle 1) and the cooling water. As a result, the temperature regulator 26 can cool the battery 18 having an increased temperature so that the battery temperature falls to a target temperature. The temperature regulator 26 may include, for example, an electric heater to heat the battery 18 having a decreased temperature so that the battery temperature rises to a target temperature.

The SOC deriving unit 28 derives (estimates) the SOC of the battery 18 on the basis of, for example, the voltage of the battery 18 (hereinafter sometimes referred to as the battery voltage).

The outside-air temperature sensor 30 is provided, for example, near the heat exchanger of the temperature regulator 26 and detects the temperature of outside air that is supplied to the heat exchanger. The temperature of outside air may be hereinafter referred to as the outside-air temperature. The speed sensor 32 detects the speed (vehicle speed) of the vehicle 1. The shift sensor 34 detects the shift position, that is, Drive, Neutral, Park, etc.

The central controller 22 is formed of a semiconductor integrated circuit that includes a central processing unit (CPU), a read-only memory (ROM) in which a program and so on are stored, a random access memory (RAM) that functions as a work area, and so on. When the program is executed, the central controller 22 functions as a switching controller 40.

In a case where, for example, the shift position of the vehicle 1 is Neutral, the switching controller 40 performs switching for performing either one of the servo-off control and the zero-torque control to thereby perform control selected from among the servo-off control and the zero-torque control.

The servo-off control is control for shutting down the power converter 20 (stops the power converter 20 so as not to perform on/off control of the switching elements 50). For example, the switching controller 40 transmits a shutdown signal for shutting down the power converter 20 to the gate signal controller 58 of the power converter 20. The gate signal controller 58 stops on/off control of the switching elements 50 in accordance with the shutdown signal. Accordingly, all switching elements 50 in the bridge circuit of the power converter 20 enter an off state.

When all switching elements 50 enter an off state, power is not supplied to the motor-generator 12 from the battery 18, and driving force is not generated in the motor-generator 12. At this time, in a case where the vehicle 1 is traveling, the motor-generator 12 rotates in response to rotation of the wheels 10, and AC power is generated in the motor-generator 12. The AC power generated in the motor-generator 12 is subjected to three-phase full-wave rectification in the bridge circuit of the diodes 52 of the power converter 20 and is smoothed by the capacitor 56 so that the AC power is converted to DC power (see FIG. 2). The DC power obtained as a result of conversion is fed back to the battery 18. That is, in the servo-off control, power generated in the motor-generator 12 can be fed back to the battery 18 via the power converter 20.

The zero-torque control is control for operating the power converter 20 so that the torque of the motor-generator 12 becomes zero. For example, the switching controller 40 transmits a torque command (zero-torque command) in which the value of a target torque indicates zero to the gate signal controller 58 of the power converter 20. In accordance with the zero-torque command, the gate signal controller 58 generates, for each switching element 50, a gate signal with which a current (q-axis current Iq) that contributes to the torque becomes zero and transmits the gate signal to the corresponding gate driving circuit 54. Each gate driving circuit 54 turns the switching element 50 on or off in accordance with the gate signal.

Accordingly, DC power of the battery 18 is converted, via the switching elements 50, to AC power having phases with which the torque becomes zero, and the AC power is supplied to the motor-generator 12. As a result, the motor-generator 12 rotates so that the torque becomes zero. In the zero-torque control, the torque of the motor-generator 12 becomes zero, and therefore, driving force for driving the vehicle 1 is not generated. In the zero-torque control, on/off control is performed for the switching elements 50, and therefore, regeneration is not performed.

For example, in a case where the shift position is changed to Neutral during traveling, the vehicle 1 is not to be driven, and therefore, the servo-off control is performed for the power converter 20 so that power generated in the motor-generator 12 can be fed back to the battery 18. However, in a case where the servo-off control is performed when the shift position is changed to Neutral in a state where the speed of the vehicle 1 is high (the number of revolutions of the motor-generator 12 is high), the voltage of the power generated in the motor-generator 12 (the induced voltage of the motor-generator 12) becomes higher than the battery voltage, and the battery 18 may be damaged. In such a case, switching to the zero-torque control is performed so as not to feed back the power and not to generate driving force.

The battery voltage changes in accordance with the battery temperature, and therefore, the number of revolutions of the motor-generator 12 (the speed of the vehicle 1) at which switching to the zero-torque control is to be performed changes depending on the battery temperature. Accordingly, when switching to the zero-torque control is performed regardless of the battery temperature, the zero-torque control may be performed in a situation where the servo-off control can be performed or the servo-off control may be performed in a situation where the zero-torque control is to be performed. That is, switching between the servo-off control and the zero-torque control might not be appropriately performed.

Accordingly, the switching controller 40 according to the embodiment derives the number of revolutions for switching, which is the number of revolutions of the motor-generator 12 that serves as a threshold at which switching between the servo-off control and the zero-torque control is performed, on the basis of the SOC of the battery 18 and the temperature of the battery 18. In a case where the current number of revolutions of the motor-generator 12 is equal to or lower than the number of revolutions for switching, the switching controller 40 performs the servo-off control. In a case where the current number of revolutions of the motor-generator 12 is higher than the number of revolutions for switching, the switching controller 40 performs the zero-torque control.

Figure 3:
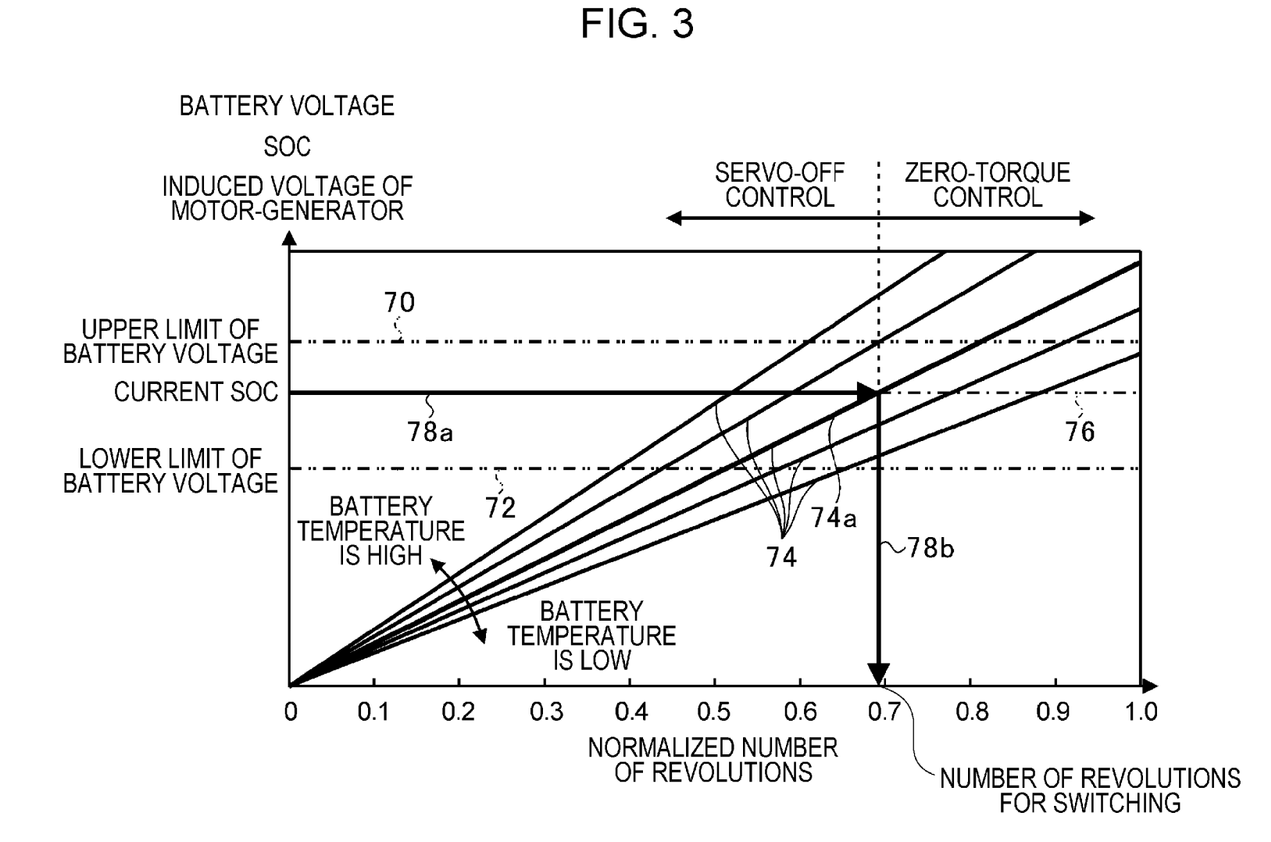
FIG. 3 is a diagram for explaining deriving of the number of revolutions for switching.

FIG. 3 is a diagram for explaining deriving of the number of revolutions for switching. The horizontal axis in FIG. 3 represents the normalized number of revolutions of the motor-generator 12 obtained by dividing the number of revolutions of the motor-generator 12 by the maximum number of revolutions (number of revolutions/maximum number of revolutions). The vertical axis in FIG. 3 represents the battery voltage, the SOC, and the induced voltage of the motor-generator 12. In FIG. 3, the dot-dot-dash line 70 indicates the upper limit of the battery voltage, the dot-dot-dash line 72 indicates the lower limit of the battery voltage, the solid lines 74 each indicate the induced voltage of the motor-generator 12, and the dot-and-dash line 76 indicates an example of the current SOC.

In general, the battery voltage gradually drops as the SOC of the battery 18 decreases. The upper limit of the battery voltage is equivalent to the battery voltage in a case where the SOC is at the maximum (for example, the SOC is 100%), and the lower limit of the battery voltage is equivalent to the battery voltage in a case where the SOC is at the minimum (for example, the SOC is 0%). The current battery voltage corresponds to the current SOC. Accordingly, on the basis of the current battery voltage between the upper limit and the lower limit of the battery voltage, the current SOC can be derived (estimated). In FIG. 3, an example of the current SOC is indicated by the height of the dot-and-dash line 76.

As indicated by each solid line 74 in FIG. 3, the induced voltage generated in the motor-generator 12 (in other words, electromotive force) gradually rises as the number of revolutions (normalized number of revolutions) of the motor-generator 12 increases.

In the battery 18, as the battery temperature increases, a chemical reaction inside the battery 18 is likely to be accelerated. As the chemical reaction inside the battery 18 is accelerated, the voltage inside the battery 18 rises, and the battery voltage (the terminal voltage of the battery 18) rises. That is, when the battery temperature changes, all of the current battery voltage, the current SOC, and the upper limit of the battery voltage and the lower limit of the battery voltage change.

In FIG. 3, the battery voltage and the SOC represented by the vertical axis are expressed in a fixed manner even when the battery temperature changes. Then, when the battery temperature changes, as indicated by the plurality of solid lines 74 in FIG. 3, the induced voltage of the motor-generator 12 is expressed in such a manner that the induced voltage appears to change in relation to the number of revolutions (normalized number of revolutions) of the motor-generator 12. For example, as indicated by the plurality of solid lines 74 in FIG. 3, the induced voltage of the motor-generator 12 is expressed in such a manner that, as the battery temperature is higher, the corresponding solid line 74 slopes to a larger degree relative to the horizontal axis in FIG. 3 and that, as the battery temperature is lower, the corresponding solid line 74 slopes to a smaller degree relative to the horizontal axis in FIG. 3.

Here, it is assumed that the relationship between the induced voltage and the normalized number of revolutions at the current battery temperature is as indicated by the solid line 74a in FIG. 3. It is further assumed that the current SOC has a value indicated by the height of the dot-and-dash line 76 in FIG. 3. In this case, as indicated by the dashed arrows 78a and 78b, the switching controller 40 derives the number of revolutions (normalized number of revolutions) of the motor-generator 12 corresponding to the point of intersection of the dot-and-dash line 76 and the solid line 74a as the number of revolutions for switching (normalized number of revolutions for switching). In the example in FIG. 3, the number of revolutions for switching is 0.69, which is a normalized number of revolutions.

As illustrated in FIG. 3, the switching controller 40 performs the servo-off control for a normalized number of revolutions equal to or lower than the derived number of revolutions for switching and performs the zero-torque control for a normalized number of revolutions higher than the derived number of revolutions for switching.

In FIG. 3, the number of revolutions of the motor-generator 12 and the number of revolutions for switching are indicated by normalized numbers of revolutions. However, the number of revolutions of the motor-generator 12 and the number of revolutions for switching may be derived as actual numbers of revolutions before normalization instead of the normalized numbers of revolutions.

That is, the switching controller 40 performs the servo-off control in a case where the current number of revolutions of the motor-generator 12 is equal to or lower than the number of revolutions for switching, and performs the zero-torque control in a case where the current number of revolutions of the motor-generator 12 is higher than the number of revolutions for switching.

Accordingly, in the vehicle 1, even in a case where the battery voltage (the induced voltage of the motor-generator 12 in appearance) changes in accordance with the battery temperature, the zero-torque control can be performed when the number of revolutions of the motor-generator 12 becomes a number of revolutions at which a voltage higher than the current battery voltage is generated. As a result, in the vehicle 1, it is possible to prevent the battery 18 from being damaged even in a case where the battery temperature changes.

In the vehicle 1, even in the case where the battery voltage (the induced voltage of the motor-generator 12 in appearance) changes in accordance with the battery temperature, the servo-off control can be performed when the number of revolutions of the motor-generator 12 becomes a number of revolutions at which a voltage equal to or lower than the current battery voltage is generated. As a result, in the vehicle 1, power can be fed back to the extent possible, and a decrease in the electrical economy can be suppressed.

To implement the above, on the switching controller 40, a switching map in which the relationships illustrated in FIG. 3 (the relationships among the SOC, the battery temperature, the induced voltage of the motor-generator 12, and the number of revolutions of the motor-generator 12 and the number of revolutions for switching) are summarized is stored in advance. The switching controller 40 uses the switching map to derive the number of revolutions for switching.

Figure 4:
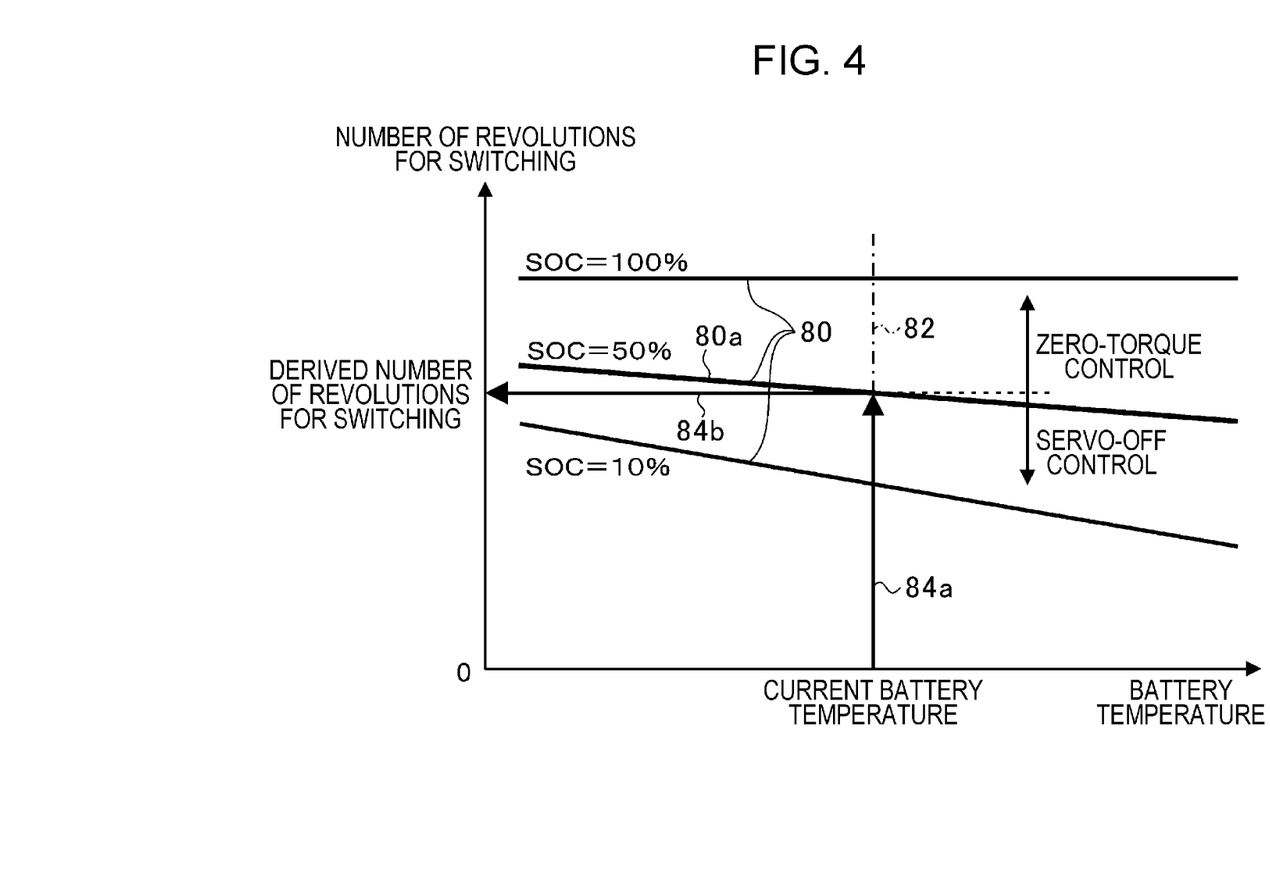
FIG. 4 is a diagram illustrating an example of a switching map.

FIG. 4 is a diagram illustrating an example of the switching map. The horizontal axis in FIG. 4 represents the battery temperature, and the vertical axis in FIG. 4 represents the number of revolutions for switching. In FIG. 4, each solid line 80 corresponds to a corresponding value of the SOC of the battery 18.

In the switching map, the battery temperature, the SOC, and the number of revolutions for switching are associated with one another. As illustrated in FIG. 4, in the switching map, as the SOC increases, the number of revolutions for switching increases. In the switching map, basically, as the battery temperature increases, the number of revolutions for switching decreases. In the switching map, as the SOC decreases, the rate at which the number of revolutions for switching decreases with the increasing battery temperature increases. In other words, in the switching map, as the SOC decreases, the solid line 80 (SOC) slopes to a larger degree relative to the horizontal axis (battery temperature) in FIG. 4.

The switching controller 40 obtains the current battery temperature from the battery temperature sensor 24 and obtains the current SOC from the SOC deriving unit 28. In FIG. 4, the current battery temperature is indicated by the dot-and-dash line 82. In FIG. 4, it is assumed that the current SOC is 50% as indicated by the solid line 80a.

The switching controller 40 applies the current battery temperature and the current SOC to the switching map to derive the number of revolutions for switching. For example, as indicated by the arrows 84a and 84b, the switching controller 40 derives the number of revolutions for switching that corresponds to the point of intersection of the dot-and-dash line 82 indicating the current battery temperature and the solid line 80a indicating the current SOC.

Thereafter, the switching controller 40 obtains the speed of the vehicle from the speed sensor 32 and derives the current number of revolutions of the motor-generator 12 on the basis of the speed of the vehicle. The number of revolutions of the motor-generator 12 may be derived on the basis of, for example, an encoder provided on the rotating shaft of the motor-generator 12 without employing the form in which the number of revolutions is derived from the speed of the vehicle.

In a case where the current number of revolutions of the motor-generator 12 is equal to or lower than the number of revolutions for switching, the switching controller 40 performs the servo-off control. In a case where the current number of revolutions is higher than the number of revolutions for switching, the switching controller 40 performs the zero-torque control.

The example in which the number of revolutions for switching is derived by using the switching map has been described; however, the switching controller 40 may derive the number of revolutions for switching by using a relational expression in which the battery temperature, the SOC, and the number of revolutions for switching are associated with one another.

As described above, as the battery temperature increases, the number of revolutions for switching decreases. As the number of revolutions for switching decreases, a domain in which the servo-off control (that is, feeding back) is possible decreases. When the battery 18 having an increased temperature is cooled by activating the temperature regulator 26, the decreased number of revolutions for switching can be increased (restored).

However, when the temperature regulator 26 is activated, power of the battery 18 is consumed by the temperature regulator 26, and the SOC decreases by the power consumed by the temperature regulator 26. When the SOC decreases, the number of revolutions for switching decreases.

That is, in activation of the temperature regulator 26, there is a trade-off between an increase in the number of revolutions for switching due to the decreasing battery temperature and a decrease in the number of revolutions for switching due to the decreasing SOC. When both the decreasing battery temperature and the decreasing SOC are taken into consideration, the following results are obtained. The battery 18 is to be cooled in a case where the number of revolutions for switching consequently increases. The battery 18 is not to be cooled in a positive manner in a case where the number of revolutions for switching consequently decreases.

Figure 5:
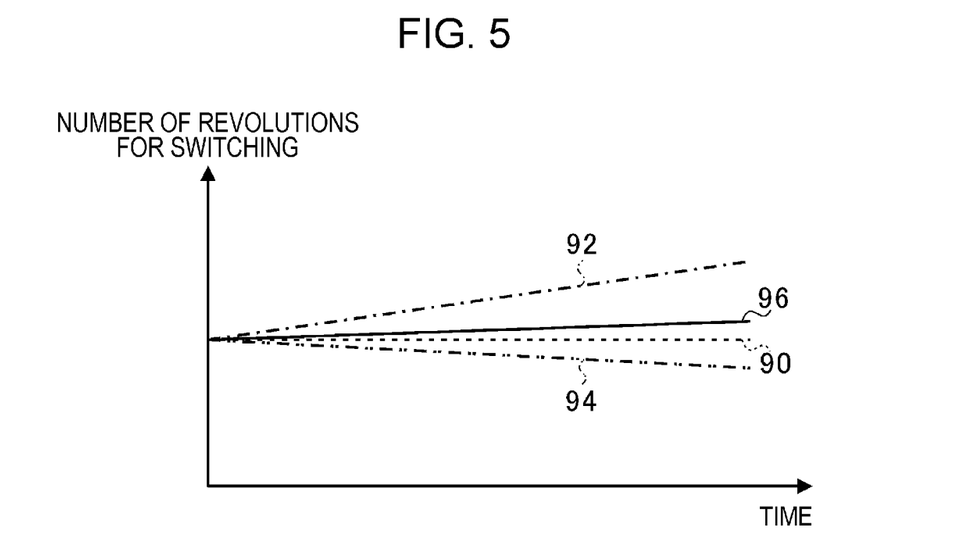
FIG. 5 is a diagram illustrating an example of future changes in the number of revolutions for switching over time in a case where it is assumed that a temperature regulator is activated.

FIG. 5 is a diagram illustrating an example of future changes in the number of revolutions for switching over time in a case where it is assumed that the temperature regulator 26 is activated. In FIG. 5, the dashed line 90 corresponds to a case where the number of revolutions for switching remains unchanged. The dot-and-dash line 92 indicates the amount of increase in the number of revolutions for switching due to the decreasing battery temperature. The dot-dot-dash line 94 indicates the amount of decrease in the number of revolutions for switching due to the decreasing SOC caused by the temperature regulator 26. The solid line 96 indicates the difference between the absolute value of the amount of increase in the number of revolutions for switching (dot-and-dash line 92) and the absolute value of the amount of decrease in the number of revolutions for switching (dot-dot-dash line 94) (hereinafter sometimes referred to as the difference in the number of revolutions for switching).

In the case where it is assumed that the temperature regulator 26 is activated, if the difference in the number of revolutions for switching (solid line 96) is larger than zero (dashed line 90), the number of revolutions for switching becomes higher than the current one in the future. In this case, the temperature regulator 26 is activated to decrease the battery temperature. Accordingly, the number of revolutions for switching can be increased in the future, and the domain in which the servo-off control is possible can be increased (restored).

In a case where the difference in the number of revolutions for switching is equal to or smaller than zero, the number of revolutions for switching becomes lower than the current one in the future. In this case, when the temperature regulator 26 is activated, the number of revolutions for switching further decreases, which has the opposite effect. Therefore, the temperature regulator 26 is not activated. Accordingly, an unwanted decrease in the number of revolutions for switching can be suppressed.

In the vehicle 1, when the temperature regulator 26 is activated, both a case where the difference in the number of revolutions for switching becomes larger than zero and a case where the difference in the number of revolutions for switching becomes equal to or smaller than zero are present. This is because, in the switching map illustrated in FIG. 4, as the SOC decreases, the rate at which the number of revolutions for switching decreases with the increasing battery temperature increases.

For example, as illustrated in FIG. 4, in a domain in which the SOC is relatively low, the amount of change in the number of revolutions for switching relative to the battery temperature is relatively large. Therefore, when the battery temperature is decreased, the number of revolutions for switching is likely to increase, and the amount of increase in the number of revolutions for switching is likely to be larger than the amount of decrease in the number of revolutions for switching. On the other hand, in a domain in which the SOC is relatively high, the amount of change in the number of revolutions for switching relative to the battery temperature is relatively small. Therefore, even when the battery temperature is decreased, the number of revolutions for switching is less likely to increase, and the amount of decrease in the number of revolutions for switching is likely to be larger than the amount of increase in the number of revolutions for switching.

Figure 6:
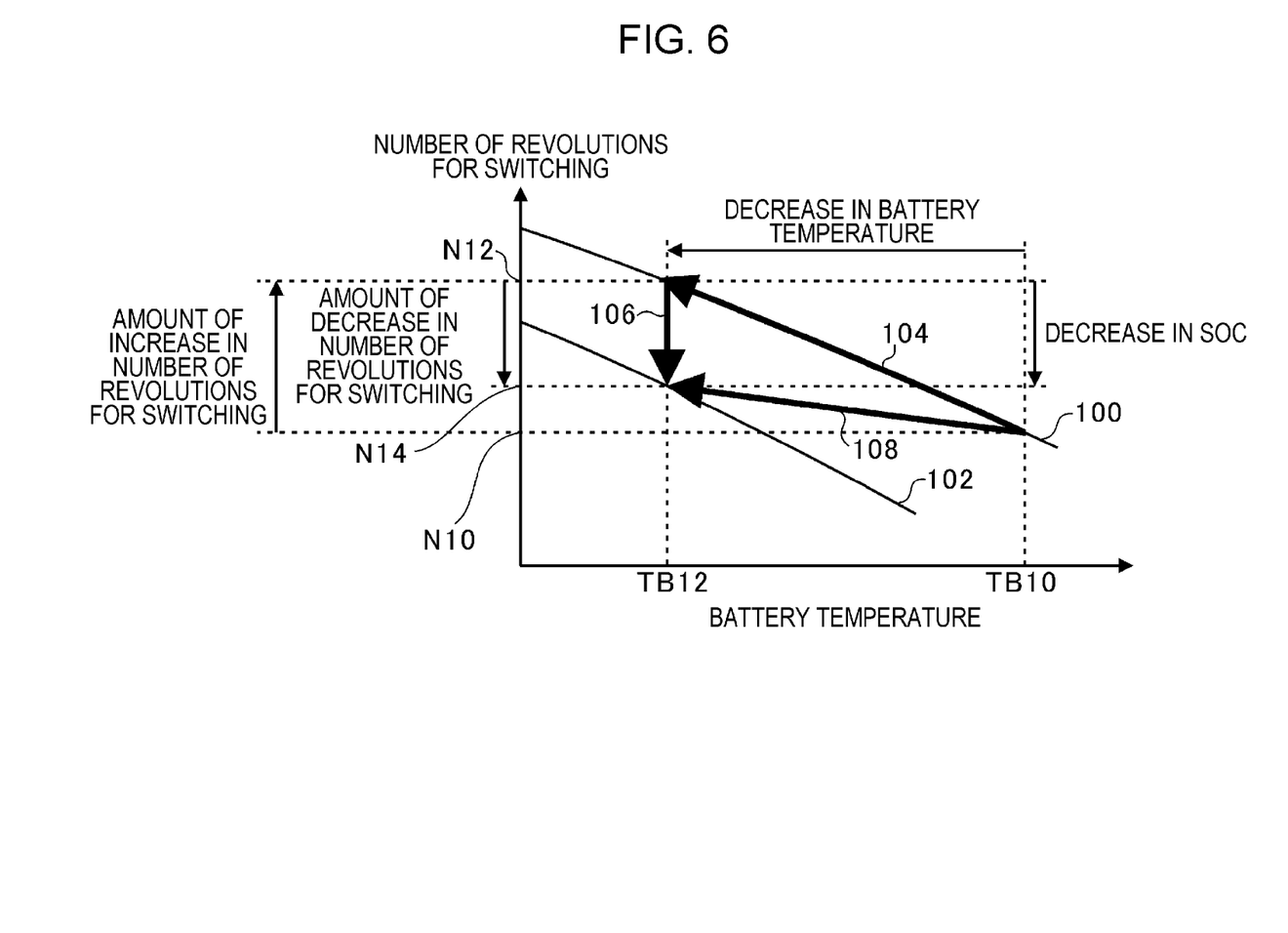
FIG. 6 is a partially enlarged diagram of a switching map illustrating an example in which the difference between the absolute value of the amount of increase in the number of revolutions for switching and the absolute value of the amount of decrease in the number of revolutions for switching is larger than zero.

FIG. 6 is a partially enlarged diagram of a switching map illustrating an example in which the difference between the absolute value of the amount of increase in the number of revolutions for switching and the absolute value of the amount of decrease in the number of revolutions for switching is larger than zero. It is assumed here that the temperature regulator 26 is activated to decrease the battery temperature from the current battery temperature TB10 to the target temperature TB12. The solid line 100 indicates a relationship between the battery temperature and the number of revolutions for switching for the current SOC. The solid line 102 indicates a relationship between the battery temperature and the number of revolutions for switching for an SOC (expected SOC) that is expected when the battery temperature is decreased to the target temperature TB12.

In a case where the battery temperature decreases from the current battery temperature TB10 to the target temperature TB12, when power consumption of the temperature regulator 26 is not taken into consideration, as indicated by the arrow 104, the number of revolutions for switching increases from the current number of revolutions for switching N10 that corresponds to the current battery temperature TB10 to the number of revolutions for switching N12 that corresponds to the target temperature TB12 along the solid line 100. In a case where power is consumed by the temperature regulator 26 and the SOC decreases from the current SOC (solid line 100) to the expected SOC (solid line 102), when changes in the battery temperature are not taken into consideration, as indicated by the arrow 106, the number of revolutions for switching decreases from the number of revolutions for switching N12 to the expected number of revolutions for switching N14 (the number of revolutions for switching that is expected when the temperature regulator 26 is activated) along the vertical axis.

Taking into consideration the above, in actuality, in a case where the temperature regulator 26 is used and the battery temperature decreases from the current battery temperature TB10 to the target temperature TB12, as indicated by the arrow 108, the number of revolutions for switching changes from the current number of revolutions for switching N10 that corresponds to the current SOC to the expected number of revolutions for switching N14 that corresponds to the expected SOC.

In FIG. 6, the absolute value of the amount of increase in the number of revolutions for switching from the current number of revolutions for switching N10 to the number of revolutions for switching N12 is larger than the absolute value of the amount of decrease in the number of revolutions for switching from the number of revolutions for switching N12 to the expected number of revolutions for switching N14. In other words, the difference between the absolute value of the amount of increase in the number of revolutions for switching and the absolute value of the amount of decrease in the number of revolutions for switching is larger than zero. Accordingly, the expected number of revolutions for switching N14 is higher than the current number of revolutions for switching N10. In this case, the switching controller 40 activates the temperature regulator 26.

Figure 7:
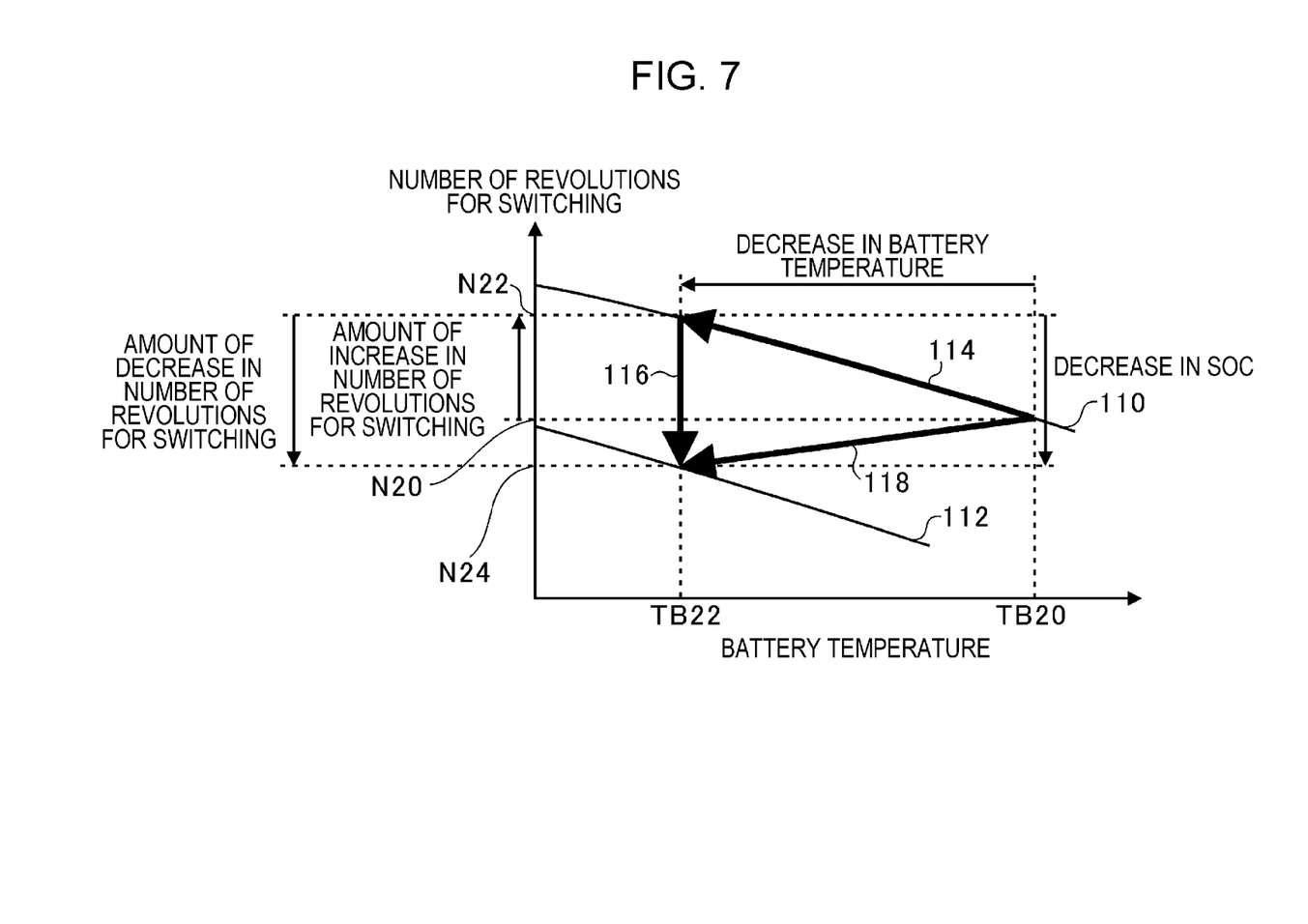
FIG. 7 is a partially enlarged diagram of a switching map illustrating an example in which the difference between the absolute value of the amount of increase in the number of revolutions for switching and the absolute value of the amount of decrease in the number of revolutions for switching is equal to or smaller than zero.

FIG. 7 is a partially enlarged diagram of a switching map illustrating an example in which the difference between the absolute value of the amount of increase in the number of revolutions for switching and the absolute value of the amount of decrease in the number of revolutions for switching is equal to or smaller than zero. It is assumed here that the temperature regulator 26 is activated to decrease the battery temperature from the current battery temperature TB20 to the target temperature TB22. The solid line 110 indicates a relationship between the battery temperature and the number of revolutions for switching for the current SOC. The solid line 112 indicates a relationship between the battery temperature and the number of revolutions for switching for an SOC (expected SOC) that is expected when the battery temperature is decreased to the target temperature TB22.

In a case where the battery temperature decreases from the current battery temperature TB20 to the target temperature TB22, when power consumption of the temperature regulator 26 is not taken into consideration, as indicated by the arrow 114, the number of revolutions for switching increases from the current number of revolutions for switching N20 that corresponds to the current battery temperature TB20 to the number of revolutions for switching N22 that corresponds to the target temperature TB22 along the solid line 110. In a case where power is consumed by the temperature regulator 26 and the SOC decreases from the current SOC (solid line 110) to the expected SOC (solid line 112), when changes in the battery temperature are not taken into consideration, as indicated by the arrow 116, the number of revolutions for switching decreases from the number of revolutions for switching N22 to the expected number of revolutions for switching N24 (the number of revolutions for switching that is expected when the temperature regulator 26 is activated) along the vertical axis.

Taking into consideration the above, in actuality, in a case where the temperature regulator 26 is used and the battery temperature decreases from the current battery temperature TB20 to the target temperature TB22, as indicated by the arrow 118, the number of revolutions for switching changes from the current number of revolutions for switching N20 that corresponds to the current SOC to the expected number of revolutions for switching N24 that corresponds to the expected SOC.

In FIG. 7, the absolute value of the amount of increase in the number of revolutions for switching from the current number of revolutions for switching N20 to the number of revolutions for switching N22 is equal to or smaller than the absolute value of the amount of decrease in the number of revolutions for switching from the number of revolutions for switching N22 to the expected number of revolutions for switching N24. In other words, the difference between the absolute value of the amount of increase in the number of revolutions for switching and the absolute value of the amount of decrease in the number of revolutions for switching is equal to or smaller than zero. Accordingly, the expected number of revolutions for switching N24 is lower than the current number of revolutions for switching N20. In this case, the switching controller 40 does not activate the temperature regulator 26.

To implement the above, the switching controller 40 first sets the target temperature of the battery 18 that is cooled by the temperature regulator 26. The target temperature is set on the basis of, for example, the current battery temperature. For example, the switching controller 40 sets a temperature lower than the current battery temperature by a predetermined temperature (for example, 10° C.) as the target temperature. The switching controller 40 applies the current SOC, the current battery temperature, and the target temperature to the switching map to derive the amount of increase in the number of revolutions for switching.

The switching controller 40 derives the time (temperature regulation time) taken for the battery temperature to reach the target temperature on the basis of the current outside-air temperature, the current battery temperature, the target temperature, and the cooling capacity of the temperature regulator 26. The switching controller 40 derives the amount of energy use (amount of electric power) that is expected to be consumed by the temperature regulator 26 on the basis of power consumed by the temperature regulator 26 per unit time and the temperature regulation time. The switching controller 40 derives an expected SOC when the battery temperature reaches the target temperature on the basis of the amount of energy use (amount of electric power) and the current SOC. The switching controller 40 applies the current SOC, the expected SOC, and the target temperature to the switching map to derive the amount of decrease in the number of revolutions for switching.

In a case where the absolute value of the amount of increase in the number of revolutions for switching is larger than the absolute value of the amount of decrease in the number of revolutions for switching, the switching controller 40 activates the temperature regulator 26. In a case where the absolute value of the amount of increase in the number of revolutions for switching is equal to or smaller than the absolute value of the amount of decrease in the number of revolutions for switching, the switching controller 40 does not activate the temperature regulator 26.

Figure 8:
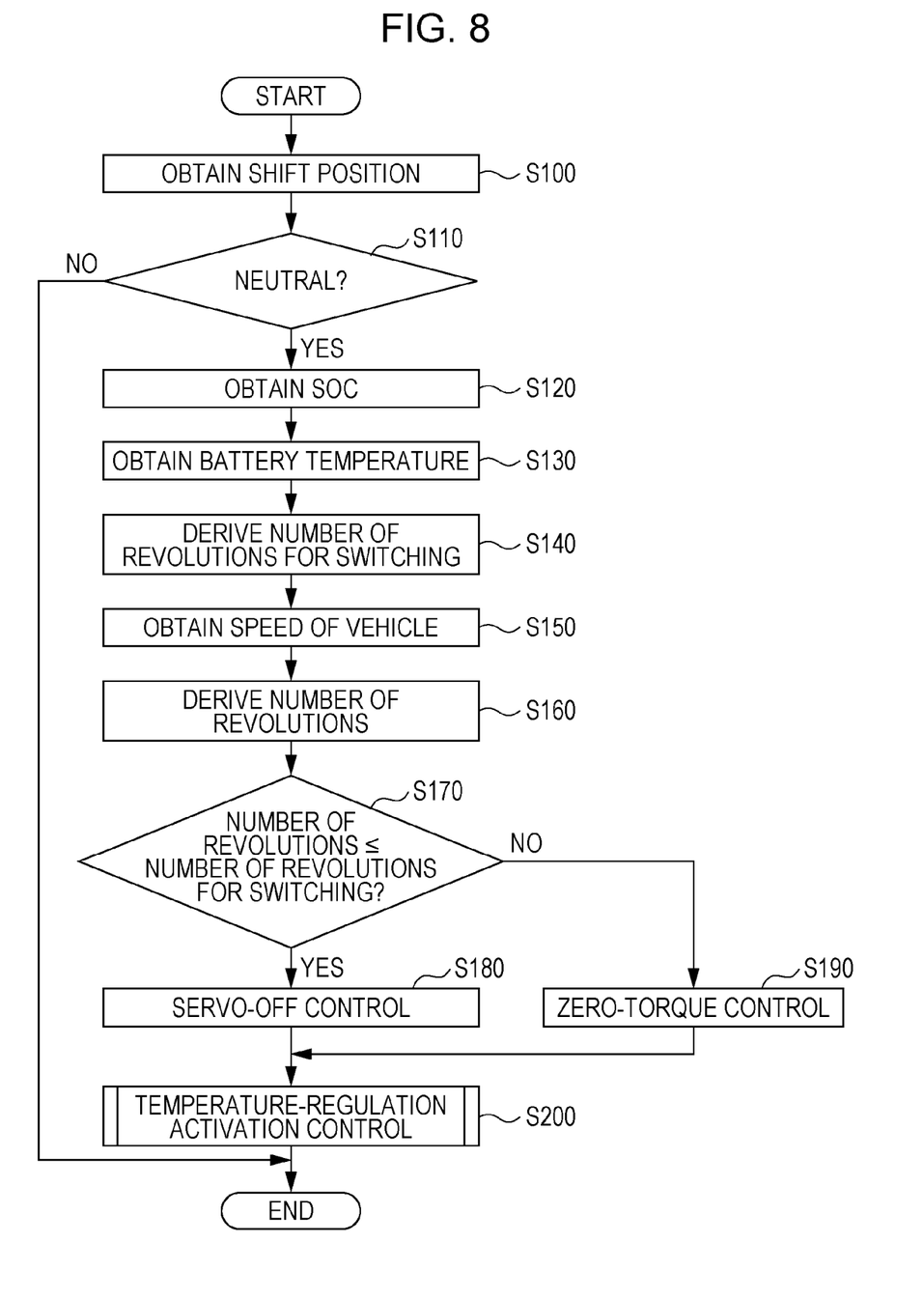
FIG. 8 is a flowchart for explaining a flow of operations of a switching controller.

FIG. 8 is a flowchart for explaining a flow of operations of the switching controller 40. The switching controller 40 performs a series of processes in FIG. 8 as interrupt control that is performed at predetermined control intervals.

At the start timing of the interrupt control, the switching controller 40 obtains the shift position from the shift sensor 34 (S100). Next, the switching controller 40 determines whether the obtained shift position is Neutral (S110).

In a case where the shift position is not Neutral (NO in S110), the switching controller 40 ends the series of processes.

In a case where the shift position is Neutral (YES in S110), the switching controller 40 obtains the current SOC derived by the SOC deriving unit 28 (S120). The switching controller 40 obtains the current battery temperature detected by the battery temperature sensor 24 (S130).

Next, the switching controller 40 derives the number of revolutions for switching on the basis of the current SOC and the current battery temperature that have been obtained (S140). For example, the switching controller 40 applies the current SOC and the current battery temperature to the switching map to derive the number of revolutions for switching.

Next, the switching controller 40 obtains the speed of the vehicle from the speed sensor 32 (S150). Next, the switching controller 40 derives the current number of revolutions of the motor-generator 12 on the basis of the obtained speed of the vehicle (S160).

Next, the switching controller 40 determines whether the current number of revolutions is equal to or lower than the number of revolutions for switching (S170). In a case where the current number of revolutions is equal to or lower than the number of revolutions for switching (YES in S170), the switching controller 40 performs the servo-off control (S180), and the flow proceeds to the process in step S200.

In a case where the current number of revolutions is not equal to or lower than the number of revolutions for switching (NO in S170), the switching controller 40 performs the zero-torque control (S190), and the flow proceeds to the process in step S200.

In step S200, the switching controller 40 performs temperature-regulation activation control in which determination as to whether to activate the temperature regulator 26 is performed (S200), and ends the series of processes.

Figure 9:
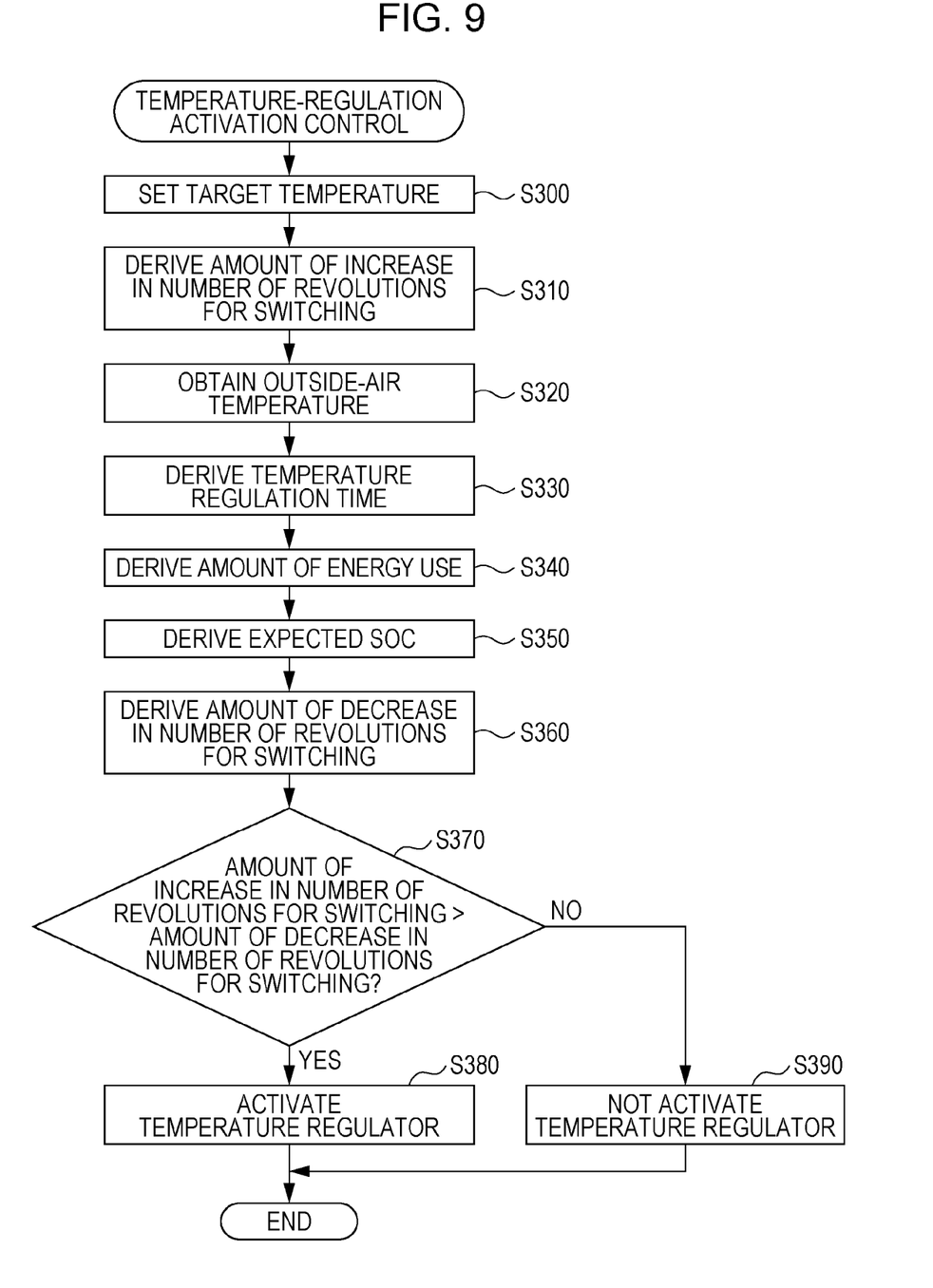
FIG. 9 is a flowchart for explaining a flow of temperature-regulation activation control.

FIG. 9 is a flowchart for explaining a flow of the temperature-regulation activation control (S200). First, the switching controller 40 sets the target temperature of the battery 18 on the basis of the current battery temperature (S300). Next, the switching controller 40 derives the amount of increase in the number of revolutions for switching on the basis of the current SOC, the current battery temperature, and the target temperature (S310).

Next, the switching controller 40 obtains the outside-air temperature from the outside-air temperature sensor 30 (S320). Next, the switching controller 40 derives the temperature regulation time on the basis of the current outside-air temperature, the current battery temperature, the target temperature, and the cooling capacity of the temperature regulator 26 (S330).

Next, the switching controller 40 derives the amount of energy use on the basis of the temperature regulation time (S340). Next, the switching controller 40 derives the expected SOC on the basis of the amount of energy use and the current SOC (S350). Next, the switching controller 40 derives the amount of decrease in the number of revolutions for switching on the basis of the current SOC, the expected SOC, and the target temperature (S360).

Next, the switching controller 40 determines whether the absolute value of the amount of increase in the number of revolutions for switching is larger than the absolute value of the amount of decrease in the number of revolutions for switching (S370).

In a case where the absolute value of the amount of increase in the number of revolutions for switching is larger than the absolute value of the amount of decrease in the number of revolutions for switching (YES in S370), the switching controller 40 activates the temperature regulator 26 (S380) and ends the series of processes.

In a case where the absolute value of the amount of increase in the number of revolutions for switching is not larger than the absolute value of the amount of decrease in the number of revolutions for switching (NO in S370), the switching controller 40 does not activate the temperature regulator 26 (S390) and ends the series of processes.

As described above, the switching controller 40 of the vehicle 1 according to the embodiment derives the number of revolutions for switching, which is the number of revolutions of the motor-generator 12 that serves as a threshold at which switching between the servo-off control and the zero-torque control is performed, on the basis of the SOC of the battery 18 and the temperature of the battery 18. In a case where the number of revolutions of the motor-generator 12 is equal to or lower than the number of revolutions for switching, the switching controller 40 performs the servo-off control. In a case where the number of revolutions of the motor-generator 12 is higher than the number of revolutions for switching, the switching controller 40 performs the zero-torque control.

Accordingly, in the vehicle 1 according to the embodiment, switching between the servo-off control and the zero-torque control can be appropriately performed even when the battery temperature changes.

The switching controller 40 of the vehicle 1 according to the embodiment determines whether to activate the temperature regulator 26 on the basis of the amount of increase in the number of revolutions for switching due to a decrease in the temperature of the battery 18 caused by activation of the temperature regulator 26 and on the basis of the amount of decrease in the number of revolutions for switching due to a decrease in the SOC of the battery 18 caused by activation of the temperature regulator 26.

Accordingly, in the vehicle 1 according to the embodiment, the number of revolutions for switching in the future can be made equal to or higher than the current number of revolutions for switching while a situation where the number of revolutions for switching in the future becomes lower than the current number of revolutions for switching is suppressed. As a result, in the vehicle 1 according to the embodiment, the domain in which power can be fed back at the number of revolutions of the motor-generator 12 can be increased, and a decrease in the electrical economy can be suppressed.

In the embodiment, the example has been described in which, in a case where the shift position is Neutral, the number of revolutions for switching is derived and the servo-off control or the zero-torque control is performed. However, in a case where the shift position is other than Neutral, the switching controller 40 may perform the control in which the switching controller 40 derives the number of revolutions for switching and performs switching between the servo-off control and the zero-torque control. For example, in a case where the shift position is Drive and an acceleration operation using the accelerator pedal is not performed (in a case where the amount of pressing of the accelerator pedal is zero), the switching controller 40 may perform the control in which the switching controller 40 derives the number of revolutions for switching and performs switching between the servo-off control and the zero-torque control.

The embodiment of the disclosure has been described with reference to the attached drawings; however, the embodiment of the disclosure is not limited to the above-described embodiment, as a matter of course. It is obvious that a person skilled in the art can conceive of various modifications and changes within the scope described in the claims, and it is to be understood that such modifications and changes are also within the technical scope of the embodiment of the disclosure, as a matter of course.

The switching controller 40 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the switching controller 40. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle comprising:
a battery;
a motor-generator configured to be coupled to a wheel;
a power converter capable of converting and supplying, to the motor-generator, power of the battery and capable of converting and feeding back, to the battery, power generated in the motor-generator in response to rotation of the wheel;
an SOC deriving unit configured to derive a state-of-charge of the battery;
a battery temperature sensor configured to detect a temperature of the battery; and
a switching controller configured to derive a number of revolutions for switching on a basis of the state-of-charge of the battery and the temperature of the battery, the number of revolutions for switching being a number of revolutions of the motor-generator that serves as a threshold at which switching between servo-off control and zero-torque control is performed, the servo-off control being control that allows the power to be fed back via the power converter, the zero-torque control being control in which the power converter is controlled so that a torque of the motor-generator becomes zero, and to perform the servo-off control in a case where the number of revolutions of the motor-generator is equal to or lower than the number of revolutions for switching and perform the zero-torque control in a case where the number of revolutions of the motor-generator is higher than the number of revolutions for switching.

2. The vehicle according to claim 1, further comprising a temperature regulator configured to be capable of cooling the battery by consuming the power of the battery, wherein
the switching controller is configured to determine whether to activate the temperature regulator on a basis of an amount of increase in the number of revolutions for switching due to a decrease in the temperature of the battery caused by activation of the temperature regulator and on a basis of an amount of decrease in the number of revolutions for switching due to a decrease in the state-of-charge of the battery caused by activation of the temperature regulator.

3. A vehicle comprising:
a battery;
a motor-generator configured to be coupled to a wheel;
a power converter configured to be capable of converting and supplying, to the motor-generator, power of the battery and to be capable of converting and feeding back, to the battery, power generated in the motor-generator in response to rotation of the wheel;
an SOC deriving unit configured to derive a state-of-charge of the battery;
a battery temperature sensor configured to detect a temperature of the battery; and
circuitry configured to
derive a number of revolutions for switching on a basis of the state-of-charge of the battery and the temperature of the battery, the number of revolutions for switching being a number of revolutions of the motor-generator that serves as a threshold at which switching between servo-off control and zero-torque control is performed, the servo-off control being control that allows the power to be fed back via the power converter, the zero-torque control being control in which the power converter is controlled so that a torque of the motor-generator becomes zero,
perform the servo-off control in a case where the number of revolutions of the motor-generator is equal to or lower than the number of revolutions for switching, and
perform the zero-torque control in a case where the number of revolutions of the motor-generator is higher than the number of revolutions for switching.

* * * * *